(12) United States Patent
Yang et al.

(10) Patent No.: US 7,978,054 B2
(45) Date of Patent: *Jul. 12, 2011

(54) APPARATUS, SYSTEMS, AND METHODS TO SUPPORT SERVICE CALLS

(75) Inventors: Xiao Ping Yang, Shanghai (CN); Chih-Lung Hou, Shanghai (CN); Xiao Feng Sheng, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 384 days.

This patent is subject to a terminal disclaimer.

(21) Appl. No.: 11/577,244

(22) PCT Filed: Jun. 25, 2005

(86) PCT No.: PCT/CN2005/000925
§ 371 (c)(1),
(2), (4) Date: Apr. 13, 2007

(87) PCT Pub. No.: WO2007/000072
PCT Pub. Date: Jan. 4, 2007

(65) Prior Publication Data
US 2009/0049195 A1    Feb. 19, 2009

(51) Int. Cl.
*G08B 9/00* (2006.01)
(52) U.S. Cl. .................... 340/286.02; 709/227
(58) Field of Classification Search ............. 340/825.36, 340/286.02, 815.4, 825.69, 825.72; 709/223–226, 709/244, 219; 705/27, 15; 345/1.3; 707/512
See application file for complete search history.

(56) References Cited

U.S. PATENT DOCUMENTS

| | | | |
|---|---|---|---|
| 4,616,214 A | 10/1986 | Naito | |
| 4,638,312 A | 1/1987 | Quinn et al. | |
| 4,777,488 A | 10/1988 | Carlman et al. | |
| 5,592,676 A | 1/1997 | Bonnafoux | |
| 5,790,803 A | 8/1998 | Kinoshita et al. | |

(Continued)

FOREIGN PATENT DOCUMENTS

CN    1131859 A    9/1996

(Continued)

OTHER PUBLICATIONS

"International Search Report for Application No. PCT/CN2005/000925, date mailed Mar. 9, 2006," 6 pgs.

(Continued)

*Primary Examiner* — Brent Swarthout
(74) *Attorney, Agent, or Firm* — Schwegman, Lundberg & Woessner, P.A.

(57) ABSTRACT

In an embodiment, an apparatus, method, and/or system support a service request made by a computer user in an Internet café or similar electronic service environment. A user may operate a café-provided user terminal in a multi-terminal network controlled by a café service console. The user may operate a switch on the terminal to transmit a service request to the service console. A visible and/or audible indication may be provided to the user, via a suitable indicator on the terminal, regarding the status of the user's service request. The user's service request may cause service-related information to be displayed on a second display of the user terminal for selection by the user. The user may speak with a service administrator using a voice over Internet protocol module built into the terminal. Other embodiments are described and claimed.

22 Claims, 6 Drawing Sheets

U.S. PATENT DOCUMENTS

| | | | |
|---|---|---|---|
| 5,845,263 | A | 12/1998 | Camaisa et al. |
| 5,926,111 | A | 7/1999 | Davis et al. |
| 6,314,438 | B1* | 11/2001 | Stein et al. .................... 715/203 |
| 6,366,196 | B1 | 4/2002 | Green et al. |
| 7,321,435 | B2* | 1/2008 | Cherry et al. ............... 358/1.14 |
| 7,336,654 | B2* | 2/2008 | Barkley et al. ................ 370/352 |
| 7,756,947 | B2 | 7/2010 | Yang |
| 2002/0123983 | A1* | 9/2002 | Riley et al. ........................ 707/1 |
| 2002/0190919 | A1* | 12/2002 | Lee ................................ 345/1.3 |
| 2003/0182209 | A1* | 9/2003 | Ge et al. .......................... 705/27 |
| 2003/0210277 | A1* | 11/2003 | Harada .......................... 345/810 |
| 2005/0066218 | A1 | 3/2005 | Stachura et al. |
| 2005/0130717 | A1 | 6/2005 | Gosieski, Jr. et al. |
| 2007/0038727 | A1* | 2/2007 | Bailey et al. .................. 709/219 |
| 2007/0055772 | A1 | 3/2007 | Yang |
| 2008/0094185 | A1 | 4/2008 | Kreiss |

FOREIGN PATENT DOCUMENTS

| | | | |
|---|---|---|---|
| CN | 2383150 | | 6/2000 |
| CN | 1300230 | A | 6/2001 |
| CN | 1323000 | | 11/2001 |
| CN | 1323000 | A | 11/2001 |
| CN | 1416093 | | 5/2003 |
| CN | 1416093 | A | 5/2003 |
| CN | 1462976 | | 12/2003 |
| CN | 1525351 | | 9/2004 |
| GB | 2314647 | | 1/1998 |
| JP | 09006298 | | 1/1997 |
| JP | 2010240388 | | 9/1998 |
| JP | 2000-358028 | | 12/2000 |
| JP | 2002182774 | | 6/2002 |
| JP | 2002203151 | | 7/2002 |
| JP | 2003030549 | | 1/2003 |
| JP | 2003248869 | | 9/2003 |
| JP | 2004139315 | | 5/2004 |
| KR | 2002071073 | | 9/2002 |
| KR | 1020020071073 | | 9/2002 |
| WO | WO-9518505 | A1 | 7/1995 |
| WO | WO-00/31672 | A1 | 6/2000 |
| WO | WO-00061253 | | 10/2000 |
| WO | WO-0137163 | A1 | 5/2001 |
| WO | WO-2004021655 | A1 | 3/2004 |
| WO | WO-2005015463 | A1 | 2/2005 |
| WO | WO-2007/000072 | A1 | 1/2007 |
| WO | WO-2007000071 | A1 | 1/2007 |

OTHER PUBLICATIONS

"Written Opinion of the International Search Authority for Application No. PCT/CN2005/000925, date mailed Mar. 9, 2006," 3 pgs.

"ASF: Standards-based Systems Management", *Intel Corporation*, Copyright 2002, (2002), 7 pgs.

Chinese Application Serial No. 200580020238.4, Office Action mailed Apr. 3, 2009, 20 pgs.

"Chinese Application Serial No. 200580050238.4, Office Action mailed Aug. 11, 2010", 22 pgs.

"Chinese Application Serial No. 200580050246.9, Office Action mailed Aug. 11, 2010", 9 pgs.

"European Application Serial No. 05757955.9, Search Report mailed Aug. 25, 2010", 3 pgs.

"European Application Serial No. 05757288.5, Search Report mailed Aug. 25, 2010", 3 pgs.

"Japanese Application Serial No. 2008-516103, Office Action mailed Jun. 22, 2010", 2 pgs.

"Korean Application Serial No. . 10-2007-7030199, Final Office Action Received mailed Jul. 26, 2010", 1 pg.

"Korean Application Serial No. 10-2007-7030199, Office Action Received mailed Jan. 15, 2010", 6 pgs.

"Korean Application Serial No. 10-2007-7030227, Final Office Action mailed Aug. 24, 2010", 1 pg.

"Japanese Application Serial No. 2008-517295, Office Action mailed Dec. 7, 2010", 6 pgs.

"Korean Application Serial No. 10-2007-7030199, Office Action mailed Nov. 8, 2010", 5 pgs.

"Korean Application Serial No. 10-2007-7030227, Office Action mailed Nov. 26, 2010", 7 pgs.

"U.S. Appl. No. 11/534,486 Notice of Allowance Mailed Dec. 9, 2009", 15 pgs.

" U.S. Appl. No. 11/534,486, Notice of Allowance mailed Feb. 25, 2010", 7 pgs.

"Korean Application Serial No. 10-2010-7023808,Office Action mailed Feb. 11, 2011", 9 Pgs.

* cited by examiner

APPARATUS, SYSTEMS, AND METHODS TO SUPPORT SERVICE CALLS

RELATED APPLICATIONS

This application is a U.S. National Stage Filing under 35 U.S.C. 371 from International Patent Application No. PCT/CN2005/000925, filed on Jun. 25, 2005, and published in English as WO 2007/000072 A1 on Jan. 4, 2007, which is incorporated herein by reference.

TECHNICAL FIELD

Embodiments of the inventive subject matter relate in general to network apparatus, systems, and methods and, in particular, to services in an Internet café, training center, office network, or like environment.

BACKGROUND

An "Internet café" is a place in which Internet access may be provided, and in which food and beverages may be served. Some Internet cafés are simpler and may provide only Internet access to their customers. Typically, an Internet café may contain a number of computers, a printer, and perhaps a scanner.

Some cafés provide a network of computer terminals with WWW (World Wide Web) on-line access; single and/or multi-user computer games; high-quality audio entertainment; a range of email and news support software; a document/image scanning and editing system; a printing system; and dial-in telephone connections to the Internet from outside the café.

Within Internet cafés, it has become increasingly necessary to provide some level of IT (Information Technology) support such as, for example, an individual who is available to help users. Currently, in Internet cafés, it is often difficult to get immediate attention and help for services. This is because, in this environment, there are generally few service personnel to serve many PC users (e.g., greater than 100) in a large space. Typically, in Internet cafés, when users need IT or some other service, they must personally search for an IT specialist or waiter or attempt to get the attention of such service personnel, which diminishes the quality of the Internet café experience.

In an attempt to solve the problem, some Internet cafés have increased the size of their service staffs.

Others have installed built-in telephone networks, providing a separate, standard telephone at each Internet café table or desk. A computer user may use the telephone to dial the number of an IT support person, to request service and/or assistance.

Also, some Internet cafés have installed a ring-call system, in which a button is built into each Internet café table. An Internet café customer may press the button, thus audibly and/or visibly signaling to service personnel that the customer desires service.

However, these known solutions, which require additional service personnel and/or dedicated request-entering equipment, are expensive and often ineffective.

BRIEF DESCRIPTION OF THE DRAWINGS

Embodiments of the inventive subject matter may be best understood by referring to the following description and accompanying drawings, which illustrate such embodiments. In the drawings.

DETAILED DESCRIPTION

In the following detailed description of some embodiments of the invention, reference is made to the accompanying drawings that form a part hereof, and in which are shown by way of illustration, but not of limitation, some specific embodiments of the invention. These embodiments are described in sufficient detail to enable those skilled in the art to understand and implement the inventive subject matter, and it is to be understood that other embodiments may be utilized and that mechanical, structural, electrical, functional, and/or procedural changes may be made without departing from the spirit and scope of the disclosure. Such embodiments of the inventive subject matter may be referred to, individually and/or collectively, herein by the term "invention" merely for convenience and without intending to voluntarily limit the scope of this application to any single invention or inventive concept if more than one is in fact disclosed. The following detailed description is, therefore, not to be taken in a limiting sense, and the scope of embodiments of the invention is defined only by the appended claims, along with the full scope of equivalents to which such claims are entitled.

Figure 1:
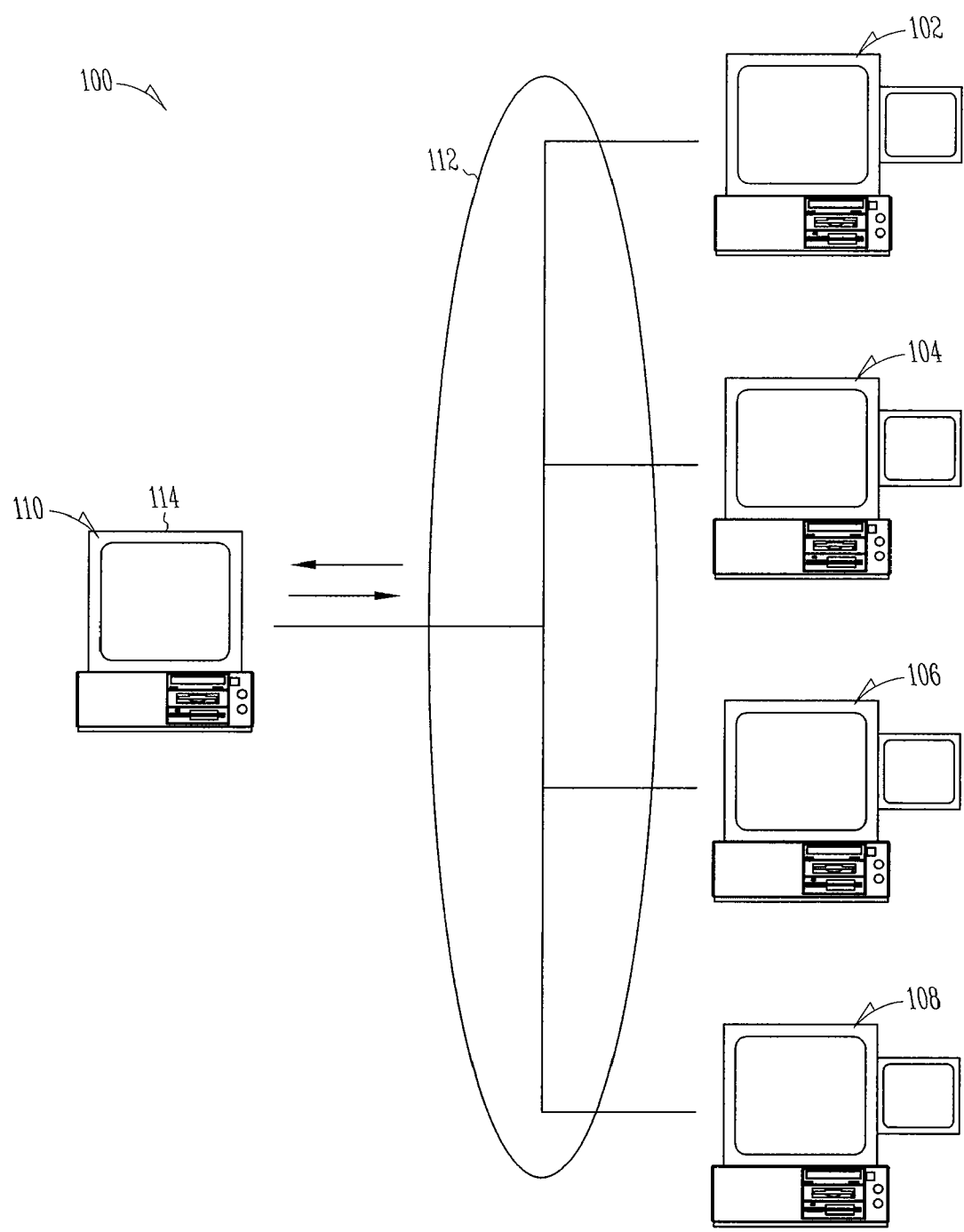
FIG. 1 depicts a schematic diagram of an electronic service environment according to an embodiment of the inventive subject matter.

FIG. 1 depicts a schematic diagram of an electronic service environment according to an embodiment of the inventive subject matter. System 100 may comprise an "electronic service network", which may also be referred to herein as an "electronic service environment". An "electronic service environment" may assume different forms, such as an "Internet café". As other examples, an "electronic service environment" may be an electronic classroom (e.g., a classroom in which computer-related and/or computer-based skills are taught) or an electronic office (e.g., an organization of any size and at any hierarchical level whose members utilize computer-based applications). In an "electronic service environment", a plurality of individual user stations are coupled to a network that is served by one or more administrators who wait for service requests from users and respond to such requests by assisting users.

System 100 may comprise a network 112, which may be operatively coupled to one or more Internet café user terminals 102, 104, 106, and 108, and to at least one service console 110. An Internet café user terminal 102, 104, 106, and 108 may be a fully functional personal computer ("PC"), or it may be a café-provided user terminal, console, or chassis to which a café user's computer may be operatively coupled.

The at least one service console 110 may be a fully functional PC, or it may be less than a fully functional PC. A service console 110 may comprise one or more electronic modules, including a motherboard (not shown), and various additional electronic boards and/or modules (not shown), including a network board (not shown) to couple the service console 110 to a network, such as network 112. Service console 110 may also include a display 114, a plurality of keys and/or keyboard (not shown), and a pointing device (not shown). In an embodiment, display 114 is a touch-screen display.

Figure 2:
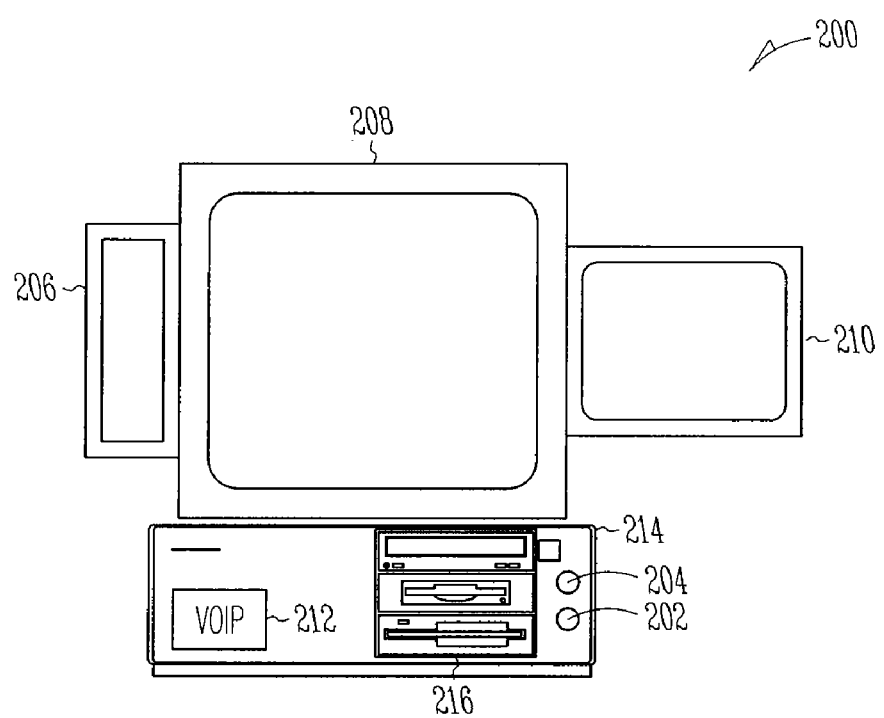
FIG. 2 depicts an example terminal in the system according to an embodiment of the inventive subject matter.

FIG. 2 depicts an example of a terminal 200 in the system 100 (refer to FIG. 1), such as user terminals 102, 104, 106, 108 in the system 100, according to an embodiment of the inventive subject matter. Terminal 200 may comprise a main housing 214 containing a plurality of electronic modules, such as a rotating-media memory module 216, a Voice-Over-Internet-Protocol ("VOIP") module 212, a motherboard (not shown), and various additional electronic boards and/or modules (not shown), including a network board (not shown) to couple the terminal 200 to a network, such as network 112 (FIG. 1). Terminal 200 may also comprise a keyboard (not shown), such as a standard PC keyboard, and a pointing device such as a mouse (not shown).

A dedicated switch 202, such as a button-type device or other device, may be built into the main housing 214 of terminal 200. Dedicated switch 202 may be operable by a user to transmit a user service request to a service console, such as service console 110 (FIG. 1). In an embodiment, dedicated switch 202 is used only for this purpose.

A visible indicator 204 (such as a light-emitting diode ("LED") or light bulb) and/or a sound transducer 206, such as one or more loudspeakers, may also be provided to communicate any desired service status information to the user terminal 200. Visible indicator 204 and/or sound transducer 206 may be activated by service console 110 (FIG. 1) upon receipt of the user's service request, for example, to provide an acknowledgement to the user that his or her request has been received.

The user terminal 200 may have a main display 208, and it may also have an auxiliary or second display 210 (e.g. an LCD display). In an embodiment, either or both the main display 208 and the second display 210 are touch-screen displays. The main display 208 may display computer-based activities that may be characterized as the primary activities of interest to the user, such as electronic mail, computer games, scanning documents or visual media, downloading and uploading visual and/or audio media, and other computer-based activities.

The second display 210 provides for visual communication between the user terminal 200 and the service console, for purposes other than the user's primary activities, such as to order food, beverages, or other items or local services, such as IT assistance or table service, as explained further below. Also, inclusion of an optional Voice-Over-Internet-Protocol ("VOIP") module 212 permits the user to communicate with the IT personnel through audible communication. VOIP module 212 may include suitable microphone and loudspeaker elements (not shown).

Embodiments of the inventive subject matter create a novel paradigm for electronic service environments. This new usage model includes a user-friendly and low-cost electronic service network.

In an embodiment, the electronic service network may include a built-in service switch (e.g., a button) on a personal computer ("PC"), interactive visual and/or audio communication, and Internet protocol ("IP") network functions. Some features of the electronic service environment include the following.

1) A user may call for help (one-button call), simply by pushing a dedicated service button or switch 202 to thereby send a request for IT service or another type of service to the service console, so long as the user PC's power cord is plugged into a power outlet and the PC is connected to the network 112 (FIG. 1). That is, this operation is capable of functioning in S5 or S0/S3 low-power consumption states (discussed further below), and it does not require the presence of an operational or active Operating System ("OS"). Thus, activation of the dedicated switch 202 is effected either during the presence of an active O/S or during the absence of an active O/S.

2) If an operational OS is present (i.e. booted up), then, in addition to sending a help request as in 1) above, a user may select additional service options through the second display 210 associated with or coupled to the terminal 200. For example, the user may choose to order food, drinks, or other items and/or services. In this mode, the user may also choose to talk with remote service personnel through VOIP module 212.

3) Whether an operational OS is present or not, or if the PC is in S5 or S0/S3 low-power consumption states, visible indicator 204 on the terminal 200 may provide the user visual feedback to indicate that the service request has been received by the service console and will be processed. Thus, the activation by the service console 110 (FIG. 1) of the visible indicator may occur independently of a state of the user terminal (102, 104, 106, 108, FIG. 1 or 200, FIG. 2), wherein the state of the user terminal is S5 low-power consumption mode or S0/S3 low-power consumption mode.

In a typical PC, an Advanced Configuration and Power Interface ("ACPI") enables at least six modes of low-power consumption:

Active (S0) Computer is fully powered ON
Standby (S1) Hard drive and video card are idle
Sleep (S2) Hard drive, video card, and central processing unit ("CPU") are idle
Suspend (S3) ALL devices are powered down; information in random access memory ("RAM") is maintained with nominal charge
Hibernation (S4) Data in memory is copied to the hard drive hibernation file, and the computer is powered down
Power OFF (S5) Computer is fully powered OFF S1 is the simplest energy-saving state, often used in older systems whose drivers or hardware won't behave well with more sophisticated levels of power management. A system at the S1 power level simply shuts down the hard drive(s) and monitor, but it leaves everything else running normally.

S2 offers greater power savings than S1, because it not only powers down the monitor and drives, but it also cuts power to the CPU and its cache.

S3 is a deeper power savings mode that shuts down almost everything except for a trickle of power needed to maintain the contents of RAM and to listen for a wake-up command.

S4 is fundamentally different from levels S1 to S3. It is a hibernation mode, where the system stops all activity. But S4 is also different from the simple power-off of level S5 because, before powering down, the S4 hibernation system writes the contents of RAM and some CPU settings to a special file on the hard drive.

S5 is the highest power savings mode, representing a complete power-off, such as that achieved by a shut-down command.

Figure 3:
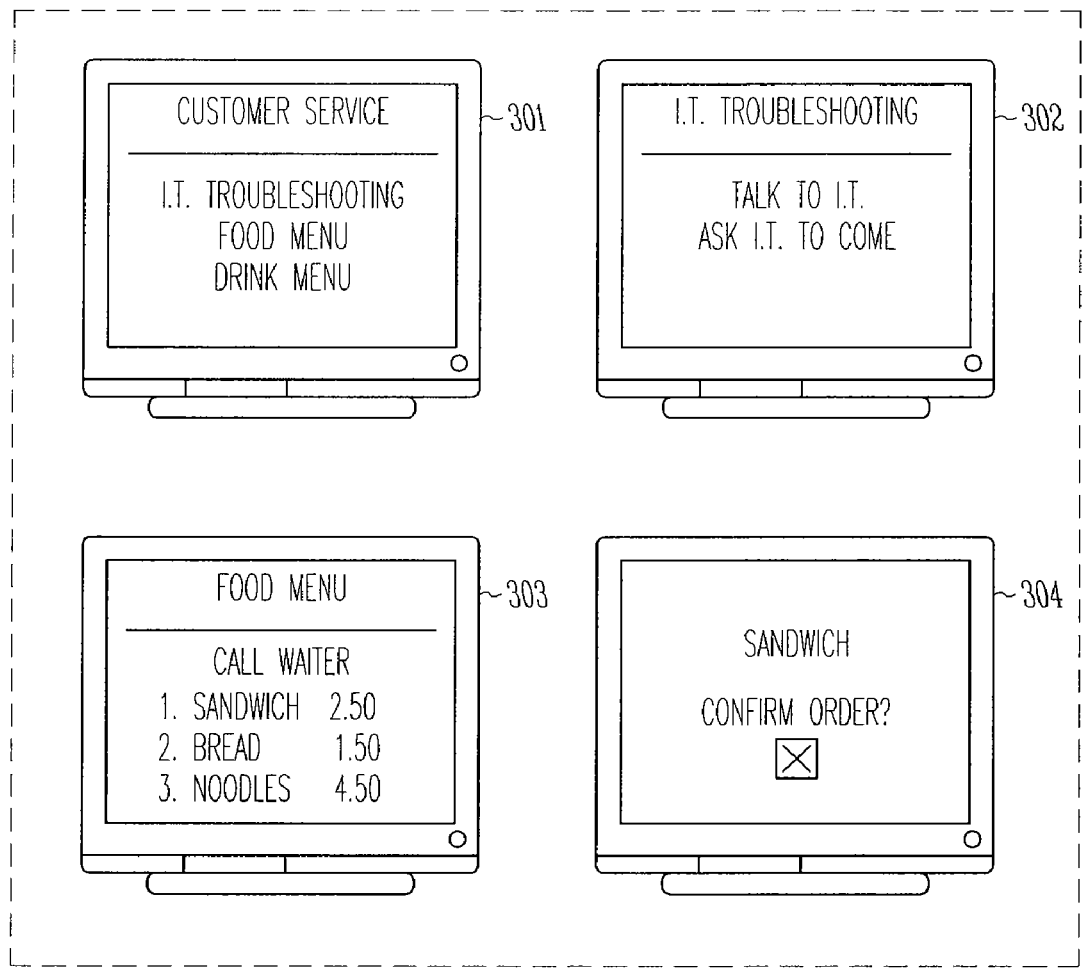
FIG. 3 depicts different possible screen views on a second display of a user terminal in a system according to an embodiment of the inventive subject matter.

FIG. 3 depicts different possible screen views 301-304 on a second display 210 of a user terminal 200 (FIG. 2) in a system 100 (FIG. 1) according to an embodiment of the inventive subject matter. When a user pushes a button or switch 202 (assuming the OS is currently active) of the user terminal 200, the second display 210 may turn on and display a customer service menu, an example of which is shown in screen view 301. From this screen 301, the user may obtain IT service and/or order food and/or drinks and/or other items. In this example, the second display 210 may display three different menu options: IT service or troubleshooting, a food menu, and a drink menu. The user may select from the menu options in any suitable manner, including touching the corresponding portion of the screen, pointing with a pointing device, and depressing one or more keys on a keyboard (not shown).

"Suitable", as used herein, means having characteristics that are sufficient to produce the desired result(s). Suitability for the intended purpose can be determined by one of ordinary skill in the art using only routine experimentation.

By selecting the IT service or troubleshooting menu (screen view 302), the user may choose to talk with the IT personnel or ask the IT personnel to come to the user's location. If the user chooses to talk with the IT personnel, a communication channel is set up, using VOIP for example, to connect the user terminal 200 (FIG. 2) to the service console 110 (FIG. 1).

By selecting the food and drink menu (screen view 303), the prices of various food and drink items in the Internet café are displayed. The user may then order the food and/or drink items on-line or choose to call a waiter to place an order. If an order is placed on-line, a confirmation may be provided (screen view 304).

Embodiments set forth in this disclosure may be applied to devices and apparatus other than a personal computer such as, for example, a portable device such as a laptop computer, a wireless communicator or a hand-held device such as a cellular phone, personal digital assistant, and the like.

The system 100 (FIG. 1) can provide voice contact between an Internet café user and a service administrator, using built-in VOIP module 212 (FIG. 2), and the system 100 can further provide a visible indicator 204, so that users may receive convenient and interactive service in Internet cafés. Because elements of the inventive subject matter may be integrated into the PC system itself, compared with other solutions (for example, a separate telephone system or ring-call system), the cost of implementing a system incorporating the inventive subject matter may be less. Thus, embodiments of the inventive subject matter may provide an inexpensive and user-friendly solution for IT services in electronic service environments such as Internet cafés.

A one-button selection by the user can bring up an E-commerce menu on a second display 210 (FIG. 2) on the user terminal 200. The user can conveniently and visually order items by navigation buttons (suitably located, e.g. on the terminal 200) or by touch-screen locations on second display 210, without interrupting other computer-based activities being displayed on the main display 208.

Figure 4:
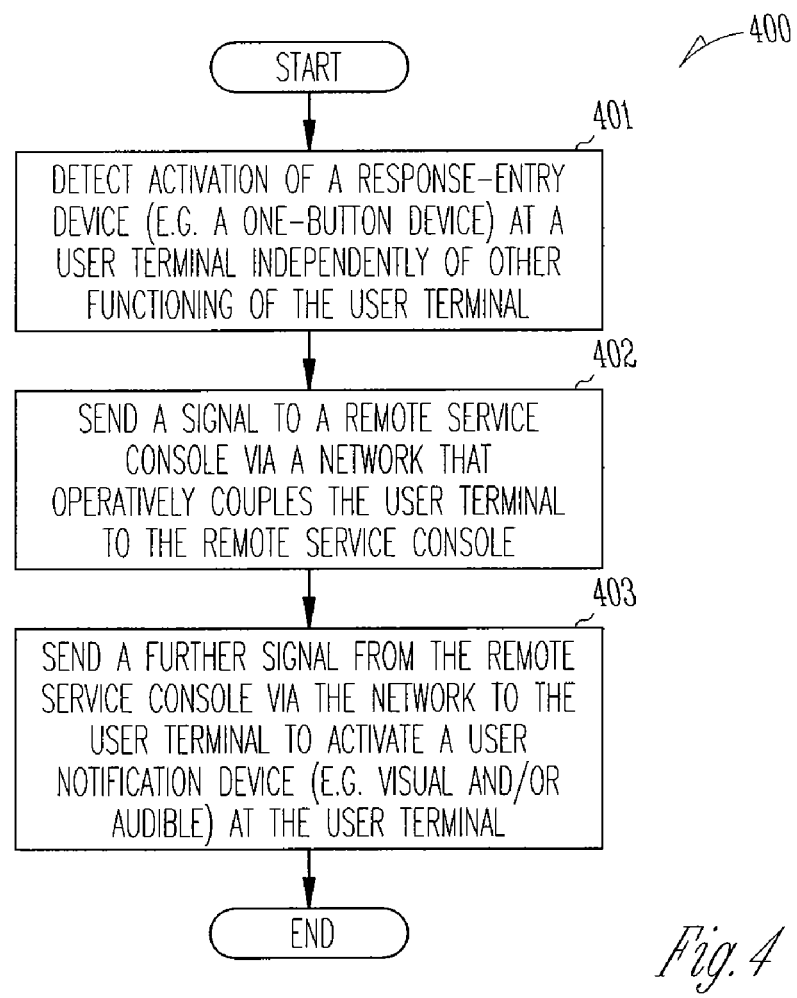
FIG. 4 is a flow diagram of one or more methods according to an embodiment of the inventive subject matter.

FIG. 4 is a flow diagram of one or more methods 400 according to an embodiment of the inventive subject matter. Such one or more methods may include detecting the activation of a response-entry device (e.g. a one-button device or switch) at a user terminal (401). The activation of the response-entry device may be independent of other functioning of the user terminal.

The one or more methods may further include sending a signal to a service console via a network operatively coupling the user terminal to the service console (402). The signal may be sent upon a user's actuation of a dedicated built-in switch of the user terminal, and it may include information concerning the power state of the user terminal (e.g. S0, S1, S2, S3, S4, or S5); information concerning the physical location of the user terminal within the Internet café or other electronic service environment; information concerning the basic-input-output-system ("BIOS") status of the user terminal; and/or information concerning the O/S status of the user terminal being operated by the user.

The one or more methods may further include sending a further signal, such as a service status signal, from the service console via the network to the user terminal that activates a visible and/or audible response device at the user terminal (403). A first service status signal may serve to inform the user that a service administrator at the service console has received the user's service request. A second service status signal may inform the user that the user's service request is ready to be completed or satisfied, or has already been satisfied. The service console's activation of a visible and/or audible indicator at the user terminal may occur independently of other operation of the user terminal, so the user may continue to engage in normal computing activities without interruption.

Additional types of service status signals may be provided, e.g. to inform the user about other aspects or status of the user's service request. For example, a flashing light may indicate that the user's service request is about to be delivered, and a non-flashing or solid light may indicate that the service request has already been delivered. As another example, if a visible response device flashes three times (or an audible response device makes three successive sounds), this may indicate that the user's service request will be satisfied in approximately three minutes. As another example, lights of different colors could be utilized. For example, a red light could indicate a problem or delay with the user's service request; a yellow light could indicate that satisfaction of the user's service request is imminent; and a green light could indicate that the user's service request has been satisfied.

Following 403, the one or more methods may end.

Figure 5:
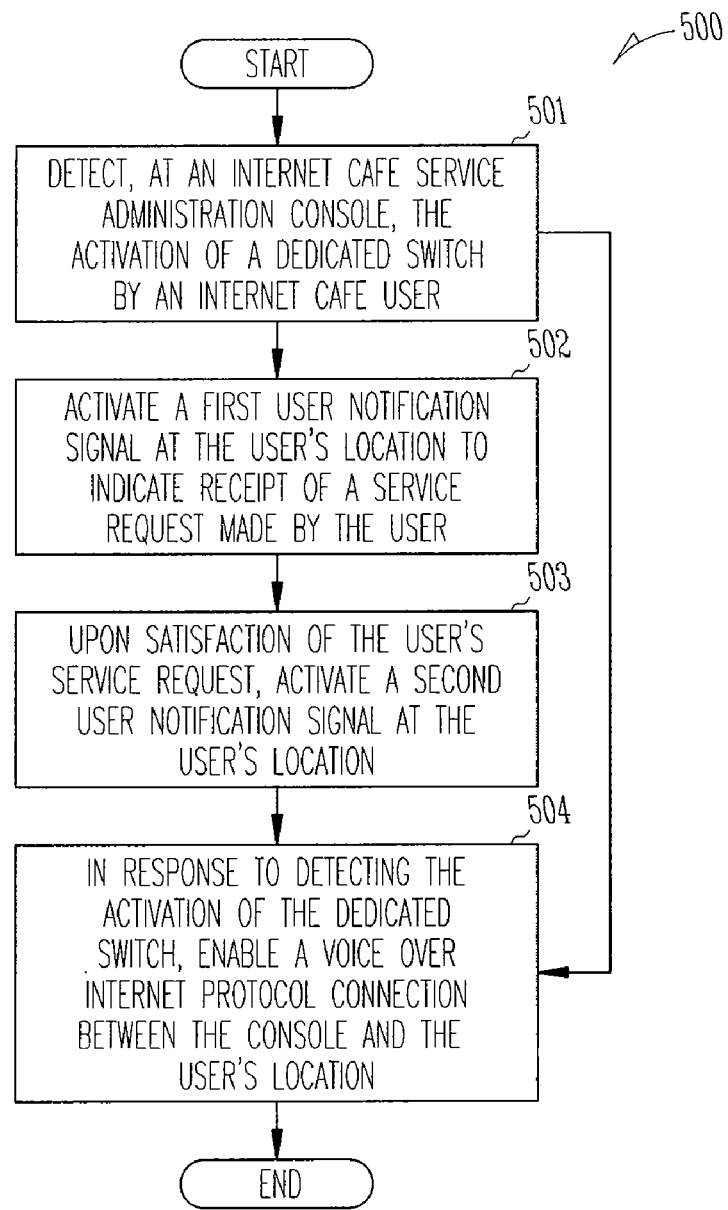
FIG. 5 depicts a flow diagram of one or more methods according to an embodiment of the inventive subject matter.

FIG. 5 depicts a flow diagram of one or more methods 500 according to an embodiment of the inventive subject matter. Such one or more methods may include detecting, at an Internet café service administration console, the activation of a dedicated switch by an Internet café user (501).

The one or more methods may further include activating a first user notification signal or service status signal (e.g. a visual and/or audible signal) at the user's location to indicate receipt of a service request made by the user (502).

The one or more methods may further include, upon satisfaction of the user's service request, the console activating a second user notification signal or service status signal (e.g. a visible and/or audible signal) at the user's location (503).

Additionally, the one or more methods may further include, in response to detecting the activation of the dedicated switch in 501, enabling a voice over Internet protocol ("VOIP") audio and/or visual connection between the console and the user's location (504), enabling the user terminal 200 (FIG. 2) to communicate with the service console 110 (FIG. 1).

Following 504, the one or more methods may end.

The operations described herein are just exemplary. It should be noted that the individual activities shown in the flow diagrams do not have to be performed in the order illustrated or in any particular order. Moreover, various activities described with respect to the methods identified herein can be executed in serial or parallel fashion. Some activities may be repeated indefinitely, and others may occur only once. Various embodiments may have more or fewer activities than those illustrated. Although the flow diagrams of FIGS. 4 and 5 show an "End", they may be performed continuously if desired.

One of ordinary skill in the art will understand the manner in which a software program can be launched from a computer-readable medium in a computer-based system to execute the functions defined in the software program. Various programming languages may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using a number of mechanisms well known to those skilled in the art, such as application program interfaces or interprocess communication techniques, including remote procedure calls. The teachings of various embodiments are not limited to any particular programming language or environment. Thus, other embodiments may be realized, such as that illustrated in FIG. 6, described below.

Figure 6:
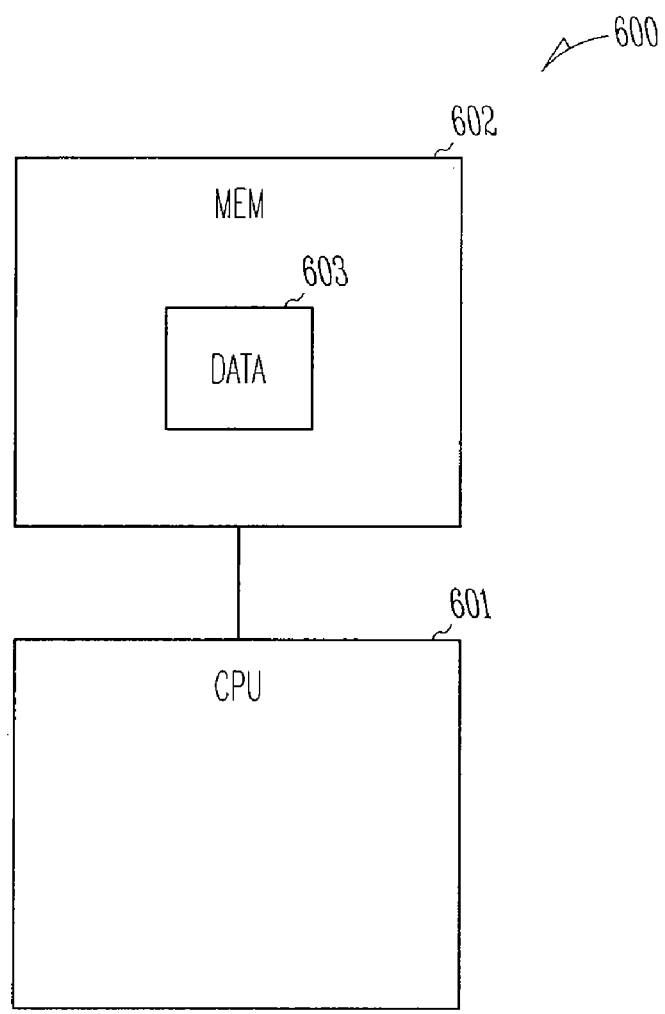
FIG. 6 depicts a block diagram of an article according to various embodiments of the inventive subject matter.

FIG. 6 depicts a block diagram of an article 600 according to various embodiments of the inventive subject matter. Examples of such embodiments may comprise a computer, a memory system, a magnetic or optical disk, some other storage device, or any type of electronic device or system. The article 600 may include one or more processor(s) 601 coupled to a machine-accessible medium such as a memory 602 (e.g., a memory including an electrical, optical, or electromagnetic conductor). The medium may contain associated information 603 (e.g., computer program instructions, data, or both) which, when accessed, results in a machine (e.g., the processor(s) 601) performing the methods disclosed herein. In an embodiment this may include detecting, at an Internet café service administration console, activation of a dedicated switch by an Internet café user, activating a first visible or audible signal to indicate receipt of a service request made by the user, and, in response to detecting the activation of the dedicated switch, enabling a voice over Internet protocol connection between the console and the location of the user.

The Abstract is provided to comply with 37 C.F.R. §1.72(b) requiring an Abstract that will allow the reader to ascertain the nature of the technical disclosure. It is submitted with the understanding that it will not be used to interpret or limit the scope or meaning of the claims.

In the foregoing Detailed Description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. Individual claims may encompass multiple embodiments of the inventive subject matter.

Although exemplary implementations of the inventive subject matter have been depicted and described in detail herein, it will be apparent to those skilled in the relevant art that various modifications, additions, substitutions, and the like can be made without departing from the spirit of the inventive subject matter, and these are therefore considered to be within the scope of the inventive subject matter as defined in the following claims.

What is claimed is:

1. Apparatus comprising:
 a terminal to couple to a network having a service console, wherein the terminal includes
  a main display and a second display, wherein the second display is physically separate from the main display;
  a dedicated switch for use only to transmit a service request to the service console;
  a visible indicator to receive a service status signal from the service console,
 wherein the visible indicator is physically separate from the main display and the second display;
  a Voice-Over-Internet-Protocol ("VOIP") module;
  at least one processor; and
  an operating system to be executed by the at least one processor;
 wherein a status of the operating system may be either active or inactive;
 wherein the visible indicator is to be activated by the service console in response to an activation of the dedicated switch;
 wherein the terminal is to communicate with the service console via the VOIP module;
 wherein the VOIP module is activated in response to activation of the switch if the operating system status is active; and
 wherein the service console's activation of the visible indicator is to occur even if the at least one processor is fully powered down and the operating system status is inactive.

2. The apparatus according to claim 1, wherein the main display is to display information unrelated to the service console, and wherein the second display is to display a plurality of menu options, a selection of one or more of which is to be transmitted to the service console.

3. The apparatus according to claim 2, wherein the plurality of menu options includes at least one of information technology service, food-ordering service, and drink-ordering service.

4. The apparatus according to claim 1, wherein the service status signal comprises an acknowledgement of receipt of the service request by the service console.

5. The apparatus according to claim 1, wherein the service status signal comprises a notification of the service request being completed.

6. The apparatus according to claim 1, wherein the terminal comprises a housing, and wherein the dedicated switch is built into the housing.

7. The apparatus according to claim 1, wherein the visible indicator comprises a light.

8. The apparatus according to claim 1, wherein the visible indicator comprises a light-emitting diode.

9. The apparatus according to claim 1, wherein the dedicated switch comprises a button-type device.

10. The apparatus according to claim 1, wherein the service console's activation of the visible indicator is to occur independently of other operations of the terminal.

11. A system comprising:
 a network;
 an Internet café service console coupled to the network;
 a plurality of café-provided terminals coupled to the network, wherein at least one of the terminals comprises a main display and a second display, wherein the second display is physically separate from the main display, a dedicated switch operable to transmit a user service request to the console, at least one processor, and an operating system to be executed by the at least one processor, wherein a status of the operating system may be either active or inactive,
 wherein the at least one terminal further comprises a visible or audible indicator, wherein the visible or audible indicator is physically separate from the main display and the second display, wherein the console is to activate the indicator upon receipt of the user service request, wherein the at least one terminal further includes a Voice-Over-Internet-Protocol ("VOIP") module, wherein the at least one terminal is to communicate with the service console via the VOIP module, wherein the VOIP module is activated in response to activation of the switch if the operating system status is active; and wherein the service console's activation of the indicator is to occur even if the at least one processor is fully powered down and the operating system status is inactive.

12. The system according to claim 11, wherein at least one of the main display and the second display comprises a touch-screen display, wherein the main display is to display information unrelated to the service console, and wherein the second display is to display a plurality of menu options, a selection of one or more of which is to be transmitted to the service console.

13. The system according to claim 11, wherein the at least one terminal comprises a housing, and wherein the dedicated switch is built into the housing.

14. The system according to claim 11, wherein the visible or audible indicator comprises a light.

15. A method of operating an Internet café system comprising a café-provided terminal and an Internet café service administration console, wherein the terminal includes a main display to display computer-based activities of primary interest to a user; a second display to display customer service menu items, the second display being physically separate from the main display and comprising touch-screen locations; a Voice-Over-Internet-Protocol ("VOIP") module, wherein the terminal is to communicate with the service console via the VOIP module; at least one processor; and an operating system to be executed by the at least one processor, wherein a status of the operating system may be either active or inactive, the method comprising:

detecting, by the service console, activation of a dedicated switch on the terminal by an Internet café user; and activating, by the service console, a first visible or audible signal on the terminal to indicate receipt of a service request made by the user, wherein the service console's activation of the indicator is to occur even if the at least one processor is fully powered down and the operating system status is inactive.

16. The method of claim 15 further comprising:
the console activating a second visible or audible signal on the terminal to indicate status information regarding the service request.

17. The method of claim 16 wherein, in detecting, the second signal is activated by a visible light on the terminal, wherein an intermittently flashing light indicates that the service request is to be satisfied soon, and wherein a non-flashing light indicates that the service request has been satisfied.

18. The method of claim 15 further comprising:
in response to detecting the activation of the dedicated switch, displaying the customer service menu items on the second display of the terminal.

19. The method of claim 18 wherein, in displaying, the customer service menu items comprise choices corresponding to categories of food, beverages, information technology services, and Voice-Over-Internet-Protocol.

20. An article comprising a machine-accessible medium having associated instructions, wherein the instructions, when accessed, result in a processor performing:

detecting, by an Internet café service administration console, activation of a dedicated switch on an Internet café-provided terminal by an Internet café user, the terminal comprising at least one processor, and an operating system to be executed by the at least one processor, wherein a status of the operating system may be either active or inactive;

activating, by the service console, a first visible or audible signal on the terminal to indicate receipt of a service request made by the user, wherein the service console's activation of the indicator is to occur even if the at least one processor is fully powered down and the operating system status is inactive; and in response to detecting the activation of the dedicated switch, enabling a Voice-Over-Internet-Protocol ("VOIP") connection between the console and a location of the user, in response to detecting the activation of the dedicated switch.

21. The article of claim 20 wherein, in enabling, the VOIP connection is enabled to the café-provided terminal.

22. The article of claim 20 wherein detecting comprises receiving information from the group consisting of power state, physical location within the Internet café, basic-input-output-system status, and operating system status of a computer being operated by the user.

* * * * *